V. LINDHOLM.
TIRE.
APPLICATION FILED MAR. 30, 1912.
1,063,888.
Patented June 3, 1913.
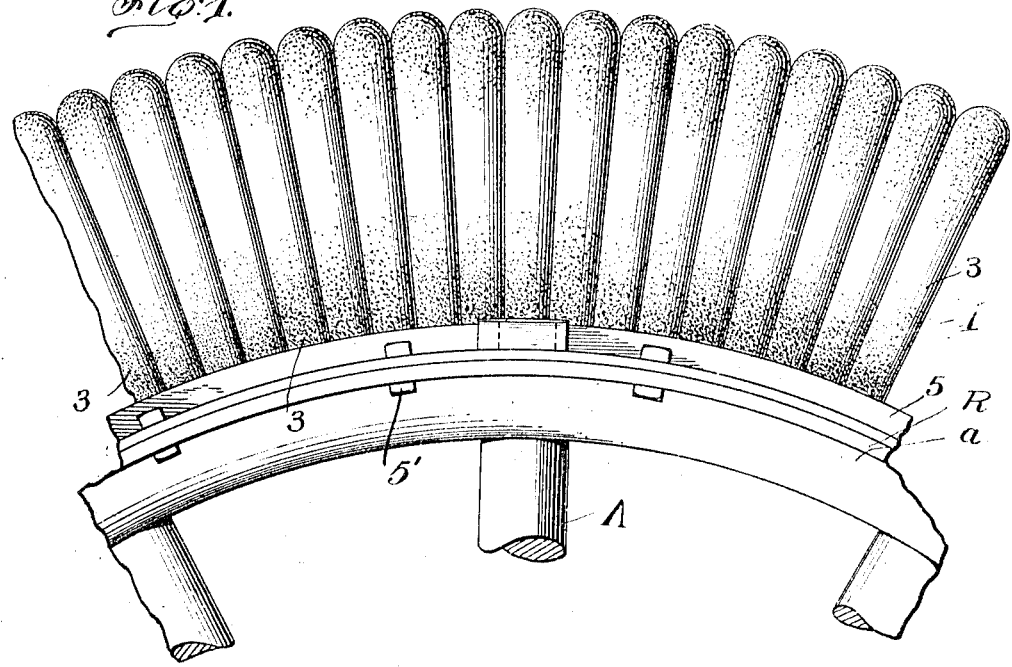
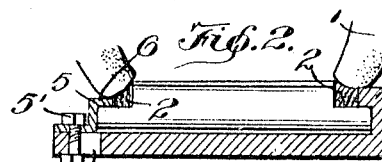
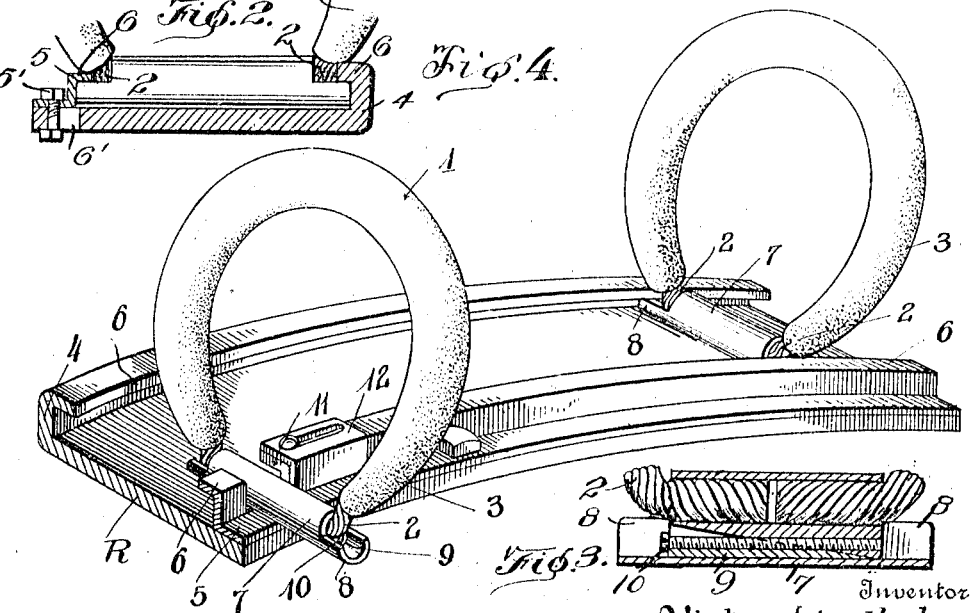
Witnesses
E. O. Crocker
John J. McCarthy
Inventor
Victor Lindholm
By Victor J. Evans
Attorney

UNITED STATES PATENT OFFICE.

VICTOR LINDHOLM, OF HOQUIAM, WASHINGTON.

TIRE.

1,063,888.

Specification of Letters Patent.   Patented June 3, 1913.

Application filed March 30, 1912.  Serial No. 687,488.

*To all whom it may concern:*

Be it known that I, VICTOR LINDHOLM, a citizen of the United States of America, residing at Hoquiam, in the county of Chehalis and State of Washington, have invented new and useful Improvements in Tires, of which the following is a specification.

This invention relates to improvements in wheel tires and has particular application to cushion tires.

In carrying out the present invention, it is my purpose to provide a tire which may be readily applied to and detached from the rim of a wheel and which shall be constructed of a plurality of sections coöperative one with the other to form the tire and capable of detachment from the wheel independently of one another whereby mutilated sections may be repaired or renewed.

It is also my purpose to provide a tire which shall include a plurality of transverse members designed to be arranged circumferentially about a wheel and adapted to be secured to said wheel against accidental displacement in tire formation.

The invention also includes the provision of a tire which shall be constructed in such manner as to possess the necessary resilient or elastic qualities and which is simple, efficient and durable in structure and capable of withstanding a relatively great amount of wear, and furthermore a tire constructed in accordance with the invention may be applied to any style of wheel without materially changing the structure thereof and may be manufactured and sold at a relatively small cost.

With the above and other objects in view, the invention consists in the construction, combination and arrangement of parts hereinafter set forth in and falling within the scope of the appended claims.

In the accompanying drawings; Figure 1 is a side elevation of a tire constructed in accordance with the present invention, the same being shown applied to a wheel. Fig. 2 is a transverse sectional view of the tire and the wheel rim. Fig. 3 is a longitudinal sectional view through one of the securing devices. Fig. 4 is a view showing the manner of applying the members of which the tire is composed to the wheel.

Similar reference characters designate like parts throughout the several views.

Referring now to the accompanying drawings in detail, my improved tire consists of a plurality of transverse members 1 adapted to lie one adjacent to the other and arranged circumferentially of the rim *a* of the wheel A. Each member 1 is preferably of substantially circular outline and, in the present embodiment of my invention, consists of a section of wire rope 2 or other suitable material which, when formed or curved as illustrated, will possess a certain amount of resilience or elasticity to cushion the shock or jars encountered by the wheel in its path of travel, and a section of rubber or the like 3 inclosing the wire rope 2 at the tread portion and sides thereof and terminating short of the proximate extremities of such rope. In this instance, I have shown my improved tire applied to a wheel equipped with the ordinary form of clencher rim R formed at one peripheral edge with a fixed flange 4 and at its opposite edge with an adjustable flange 5, each of the flanges being provided with the inturned oppositely disposed holding lips 6, 6. In the present instance, the adjustable flange 5 is equipped with a number of set bolts 5' appropriately spaced apart and each disposed within a slot 6' formed in the adjacent edge of the rim. The proximate ends of the wire rope 2, of each transverse member, in the present instance, are arranged within a cylindrical metallic tube 7 provided at its opposite ends with semi-circular outwardly extending lugs 8 and equipped with oppositely disposed wedge blocks 9 adapted to be driven into the tube 7 in relatively opposite directions to securely hold the ends of the wire rope 2 within the tube, the portions of the tube adjacent the extremities of the rope assisting the wedge blocks to hold the component parts of the members in their assembled positions. If desired, a screw 10 or the like may be threaded into the wedge blocks and have its threads disposed in relatively opposite directions so as to draw the blocks inwardly of the tube and toward each other for the purpose aforesaid. This form of my invention is applicable to the ordinary type of clencher rim and may be applied thereto without materially changing the construction of such rim, the only necessary change being to form an entrance slot in one of the flanges, for instance, the adjustable flange 5. This flange 5, is provided with a slot or way 11 which may be closed by means of a sliding plate 12 mounted upon the outer surface of the flange and secured thereto in any suitable manner or by any preferred or desired means.

To assemble the tire, the plate 12 is removed from the slot or way 11, and the metallic tube 7 of the respective member slid through said slot and into the rim R between the flanges 4 and 5 thereof, the lips 6, 6 of such flanges serving to prevent outward or radial displacement of the member. Likewise, the remaining transverse members are positioned upon the rim and moved circumferentially about the wheel until the required number of members to form a tire have been disposed upon the rim, subsequent to which the plate 12 is replaced over the slot or way 11 and the adjustable flange 5 moved inwardly of the rim to securely hold the members in tire formation, the lips 6 of both flanges and the lugs 8 of the tube coöperating with one another for this purpose.

In order to obtain a snug engagement between all of the members 1, the material forming such members is tapered from the centers of the members toward the ends so that the tread portions of the members may snugly engage one another to form the tire, as will be readily understood.

From the foregoing description taken in connection with the accompanying drawings, it will be seen that I have provided a tire which is composed of a plurality of transverse members designed to be arranged circumferentially about a wheel and capable of detachment from the wheel independently of one another so that a mutilated member may be repaired or replaced, as desired, and while I have herein shown and described one form of my invention and certain preferred means for fastening the same to a vehicle wheel, I desire to have it understood that I do not limit myself to the specific details of construction herein described and delineated, as modification and variation may be made without exceeding the scope of the claims or departing from the spirit of my invention.

I claim:

1. The combination with a wheel rim including a fixed flange and an adjustable flange having an entrance opening therein and a closure for said opening, of a plurality of members each comprising a section of material curved longitudinally, a tube receiving the free ends of said material and adapted to be slid through the entrance opening in said flange, and outwardly extending lugs at each end of said tube adapted to engage said flanges whereby the members may be disposed about the rim in tire formation.

2. The combination with a wheel rim including a fixed flange and an adjustable flange having an entrance opening therein and a closure for said opening, of a plurality of members each comprising a section of material curved longitudinally, a tube receiving the free ends of said material and adapted to be slid through the entrance opening in said flange, wedge blocks within said tube and adapted to grip the ends of said material, and outwardly extending lugs at each end of said tube adapted to engage said flanges whereby the members may be disposed about the rim in tire formation.

In testimony whereof I affix my signature in presence of two witnesses.

VICTOR LINDHOLM.

Witnesses:
PHIL. S. LOCKE,
A. L. MATHESON.

---

Copies of this patent may be obtained for five cents each, by addressing the "Commissioner of Patents, Washington, D. C."